(12) United States Patent
Tsai

(10) Patent No.: US 8,573,083 B2
(45) Date of Patent: Nov. 5, 2013

(54) FAN BIASING TRANSMISSION MECHANISM

(76) Inventor: Ching-Lang Tsai, Taichung (TW)

( * ) Notice: Subject to any disclaimer, the term of this patent is extended or adjusted under 35 U.S.C. 154(b) by 238 days.

(21) Appl. No.: 13/080,718

(22) Filed: Apr. 6, 2011

(65) Prior Publication Data

US 2012/0255381 A1    Oct. 11, 2012

(51) Int. Cl.
*F16H 3/08* (2006.01)

(52) U.S. Cl.
USPC .......................... 74/325; 74/421 R; 74/421 A

(58) Field of Classification Search
USPC ..................................... 74/325, 421 R, 421 A
See application file for complete search history.

(56) References Cited

U.S. PATENT DOCUMENTS

| | | | | | |
|---|---|---|---|---|---|
| 2,966,068 | A | * | 12/1960 | Christian | 74/421 R |
| 3,739,652 | A | * | 6/1973 | Caldwell et al. | 74/421 A |
| 4,732,049 | A | * | 3/1988 | Beny et al. | 74/421 A |
| 6,862,946 | B2 | * | 3/2005 | Sumita et al. | 74/421 A |
| 7,028,573 | B2 | * | 4/2006 | Inaba et al. | 74/409 |
| 7,191,678 | B2 | * | 3/2007 | Schunke et al. | 74/421 A |

* cited by examiner

*Primary Examiner* — Ha D Ho
(74) *Attorney, Agent, or Firm* — Muncy, Geissler, Olds & Lowe, PLLC

(57) ABSTRACT

A fan biasing transmission mechanism includes a housing having first, second and third mounting chambers, a control rod mounted in the first mounting chamber, a driving gear wheel and a driven gear mounted on the control rod, a worm coupled to a motor and meshed with the driving gear wheel, a follower gear wheel pivotally mounted in the second mounting chamber, a link coupled with the follower gear wheel, a cap covering the housing, and two speed-changing transmission gears pivotally mounted in the third mounting chamber in a stepped manner and respectively meshed with the driven gear and the follower gear wheel.

1 Claim, 4 Drawing Sheets

FAN BIASING TRANSMISSION MECHANISM

BACKGROUND OF THE INVENTION

1. Field of the Invention

The present invention relates to electric fans and more particularly, to a fan biasing transmission mechanism, which controls biasing of the fan head at a low speed.

2. Description of the Related Art

A fan biasing control structure 10 for electric fan according to the prior art, as shown in FIGS. 1 and 2, generally comprises a housing 11 having a first mounting chamber 12 and a second mounting chamber 13, a control rod 14 mounted in the first mounting chamber 12, a driving gear wheel 15 and a driven gear 16 mounted on the control rod 14, a follower gear wheel 17 pivotally mounted in the second mounting chamber 13 and meshed with the driven gear 16, a link 18 coupled with the follower gear wheel 17, a worm 1 coupled to a motor (not shown) and meshed with the driving gear wheel 15 and a cap 19 covering the housing 11. During rotation of the worm 1, the driving gear wheel 15 is driven to rotate the follower gear wheel 17, causing the link 18 to bias the fan head. This design of fan biasing control structure is still not satisfactory in function and has drawbacks as follows: (a) the diameter ratio between the driving gear wheel 15 and the follower gear wheel 17 is 1:1, i.e., the transmission speed maintains unchanged, and therefore the fan head is biased at a high speed; (b) because the driven gear 16 is directly meshed with the follower gear wheel 17 that bears the weight of the fan head directly, torque is directly acted upon the driven gear 16, and therefore the driven gear 16 wears quickly with use.

SUMMARY OF THE INVENTION

The present invention has been accomplished under the circumstances in view. It is one object of the present invention to provide a fan biasing transmission mechanism, which controls biasing of the fan head at a low speed by means of the arrangement of two transmission gears in a stepped manner. It is another object of the present invention to provide a fan biasing transmission mechanism, which utilizes the speed-changing transmission gears to share the torque during biasing of the fan head, avoiding damage to the driven gear.

To achieve these and other objects of the present invention, a fan biasing transmission mechanism includes a housing having first, second and third mounting chambers, a control rod mounted in the first mounting chamber, a driving gear wheel and a driven gear mounted on the control rod, a worm coupled to a motor and meshed with the driving gear wheel, a follower gear wheel pivotally mounted in the second mounting chamber, a link coupled with the follower gear wheel, a cap covering the housing, and two speed-changing transmission gears pivotally mounted in the third mounting chamber in a stepped manner and respectively meshed with the driven gear and the follower gear wheel.

DETAILED DESCRIPTION OF THE PREFERRED EMBODIMENT

Figure 2:
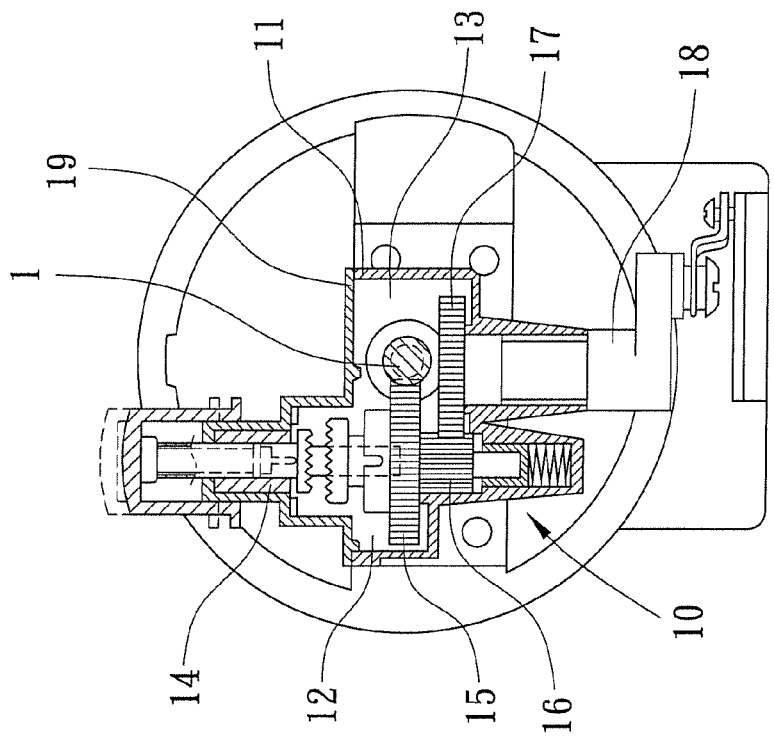
FIG. 2 is a sectional assembly view of the prior art fan biasing control structure.
Figure 1:
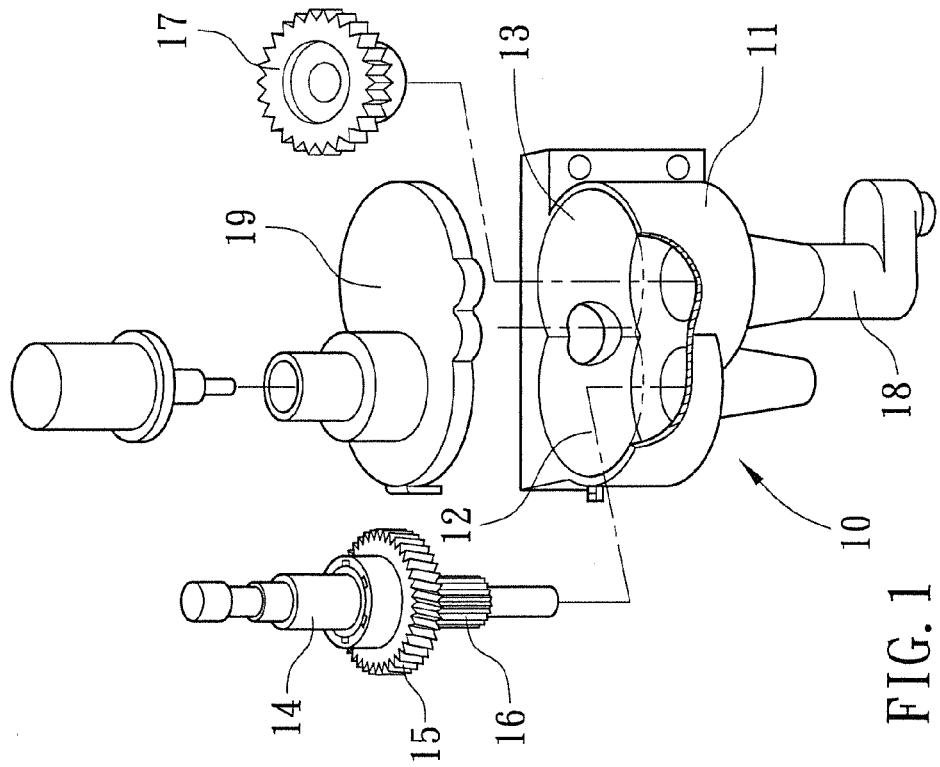
FIG. 1 is an exploded view of a fan biasing control structure for electric fan according to the prior art.
Figure 3:
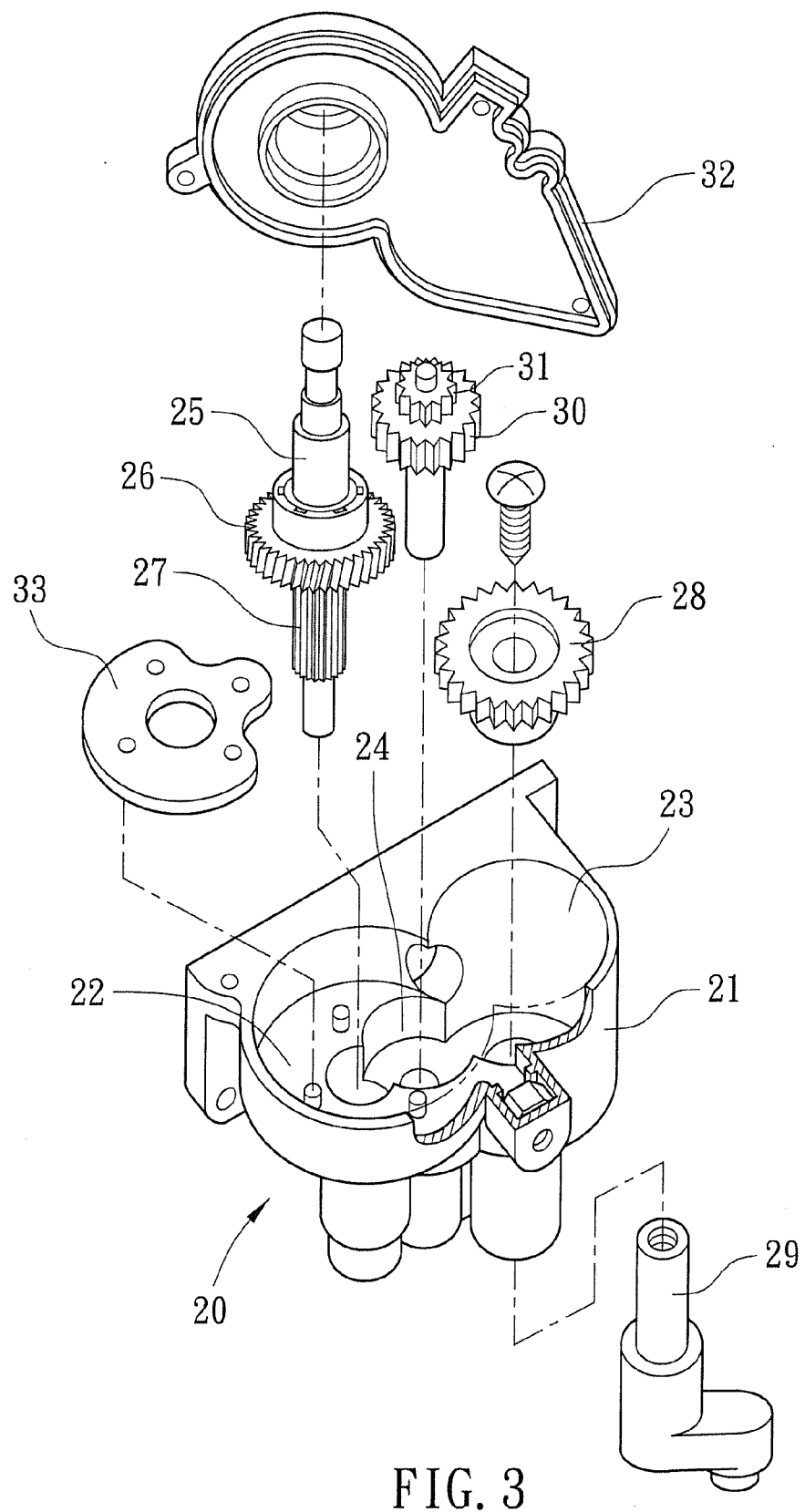
FIG. 3 is an exploded view of a fan biasing transmission mechanism in accordance with the present invention.
Figure 4:
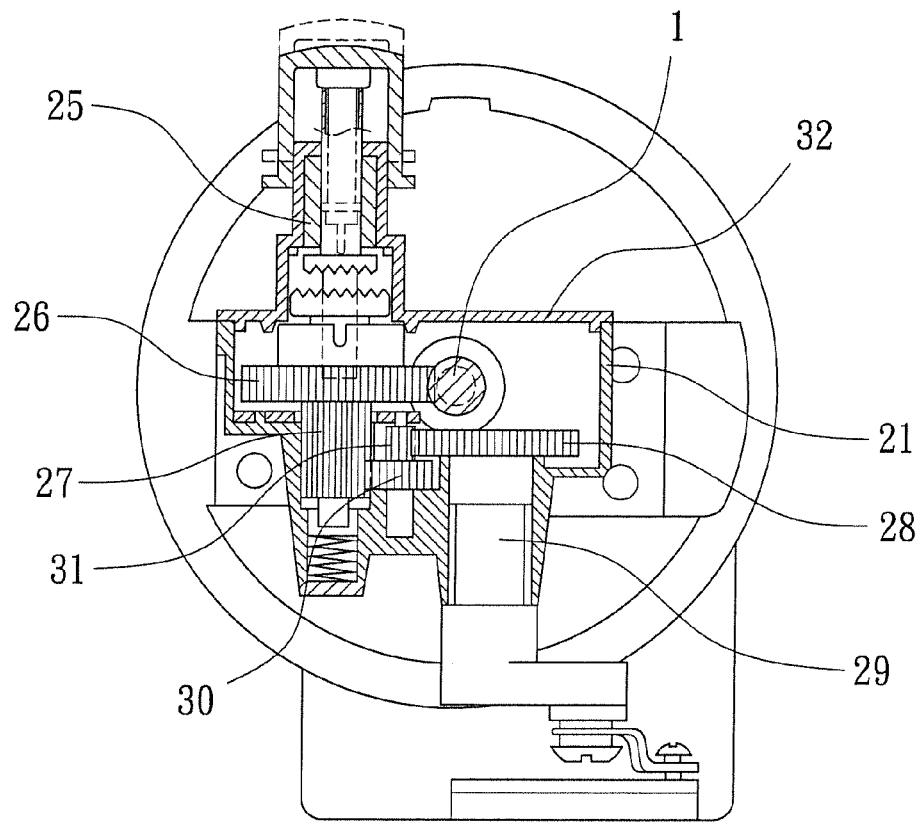
FIG. 4 is a sectional assembly view of the fan biasing transmission mechanism in accordance with the present invention.
Figure 5:
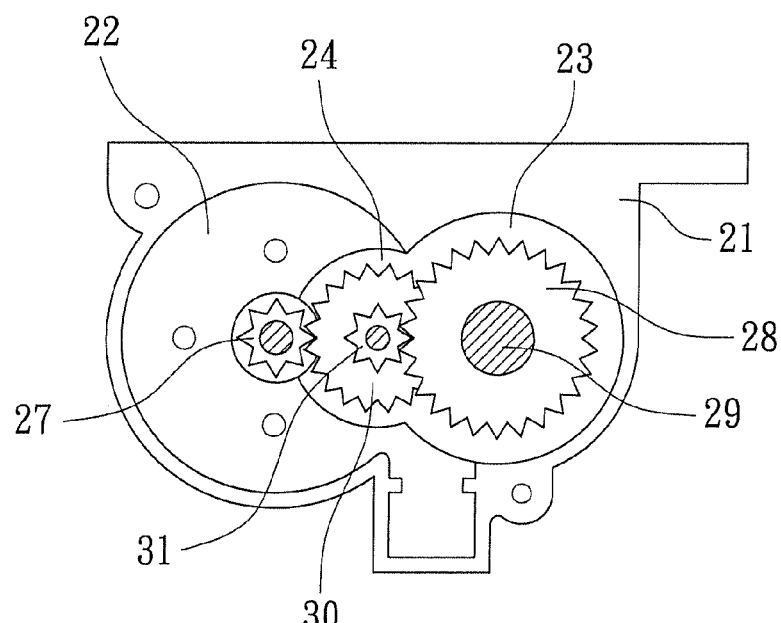
FIG. 5 is a top view of the fan biasing transmission mechanism in accordance with the present invention.

Referring to FIGS. 3~5, a fan biasing transmission mechanism 20 in accordance with the present invention is shown comprising a housing 21 having a first mounting chamber 22 and a second mounting chamber 23, a control rod 25 mounted in the first mounting chamber 22, a driving gear wheel 26 and a driven gear 27 mounted on the control rod 25, a worm 1 coupled to a motor (not shown) and meshed with the driving gear wheel 26, a follower gear wheel 28 pivotally mounted in the second mounting chamber 23, a link 29 coupled with the follower gear wheel 28, and a cap 32 covering the housing 21. The fan biasing transmission mechanism 20 further comprises a third mounting chamber 24 disposed in the housing 21 between the first mounting chamber 22 and the second mounting chamber 23, two speed-changing transmission gears 30;31 pivotally mounted in the third mounting chamber 24 in a stepped manner and respectively meshed with the driven gear 27 and the follower gear wheel 28, and a locating plate 33 stopped at the top side of the transmission gear 31 to keep the speed-changing transmission gears 30;31 in place.

The fan biasing transmission mechanism 20 has the advantages:

(1) As shown in FIGS. 4 and 5, during rotation of the worm 1 to rotate the driving gear wheel 26, the driven gear 27 is driven by the driving gear wheel 26 to rotate the speed-changing transmission gears 30;31, causing rotation of the driven gear 27 and the follower gear wheel 28 and movement of the link 29 to bias the fan head. Subject to the speed changing action of the speed-changing transmission gears 30;31, the biasing speed of the fan head is reduced.

(2) The speed-changing transmission gears 30;31 are set between the driven gear 27 and the follower gear wheel 28, and therefore the speed-changing transmission gears 30;31 share the torque during biasing of the fan head, avoiding damage to the driven gear 27.

Figure 6:
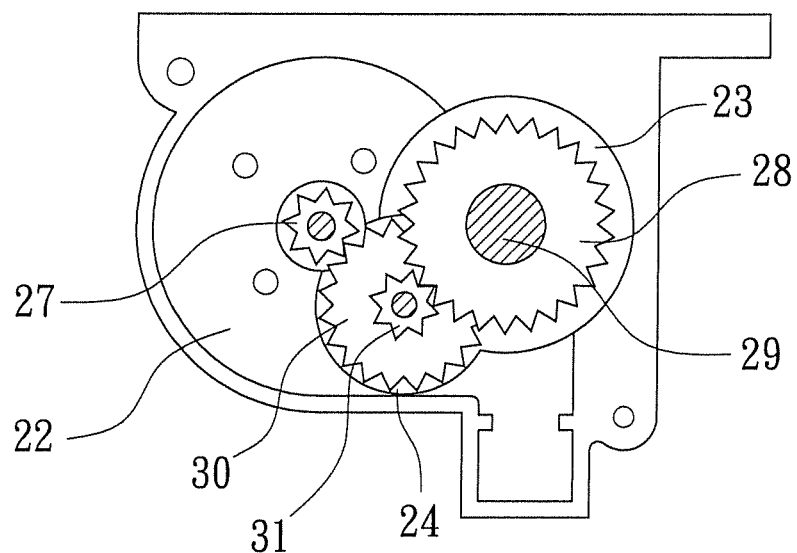
FIG. 6 is a top view of an alternate form of the fan biasing transmission mechanism in accordance with the present invention.

Referring to FIGS. 3 and 5 again, the first mounting chamber 22, the second mounting chamber 23 and the third mounting chamber 24 are so arranged that the related gears are kept in a line. FIG. 6 shows an alternate form of the present invention. According to this alternate form, the related gears are kept in the three angles of a triangle.

Although particular embodiments of the invention have been described in detail for purposes of illustration, various modifications and enhancements may be made without departing from the spirit and scope of the invention. Accordingly, the invention is not to be limited except as by the appended claims.

What the invention claimed is:

1. A fan biasing transmission mechanism, comprising:
  a housing having a first mounting chamber, a second mounting chamber and a third mounting chamber disposed intermediate said first and second mounting chambers;
  a control rod mounted in said first mounting chamber, said control rod having a driving gear wheel and a driven gear mounted thereon;
  a worm coupled to a motor and meshed with said driving gear wheel;

a follower gear wheel pivotally mounted in said second mounting chamber;

a link coupled with said follower gear wheel;

two speed-changing transmission gears pivotally mounted on a common shaft in a stepped manner in said third mounting chamber and respectively meshed with said driven gear and said follower gear wheel, a lower end of said shaft being supported in said third mounting chamber;

a locating plate bridging between said first and third mounting chambers and having an opening for receiving an upper end of said shaft therein for supporting said two speed-changing transmission gears in respective meshing engagement with said driven gear and said follower gear wheel; and a cap forming a closure for said housing, said cap having a cavity for receiving an upper end of said control rod therein to provide support thereof.

\* \* \* \* \*